UNITED STATES PATENT OFFICE 2,404,550

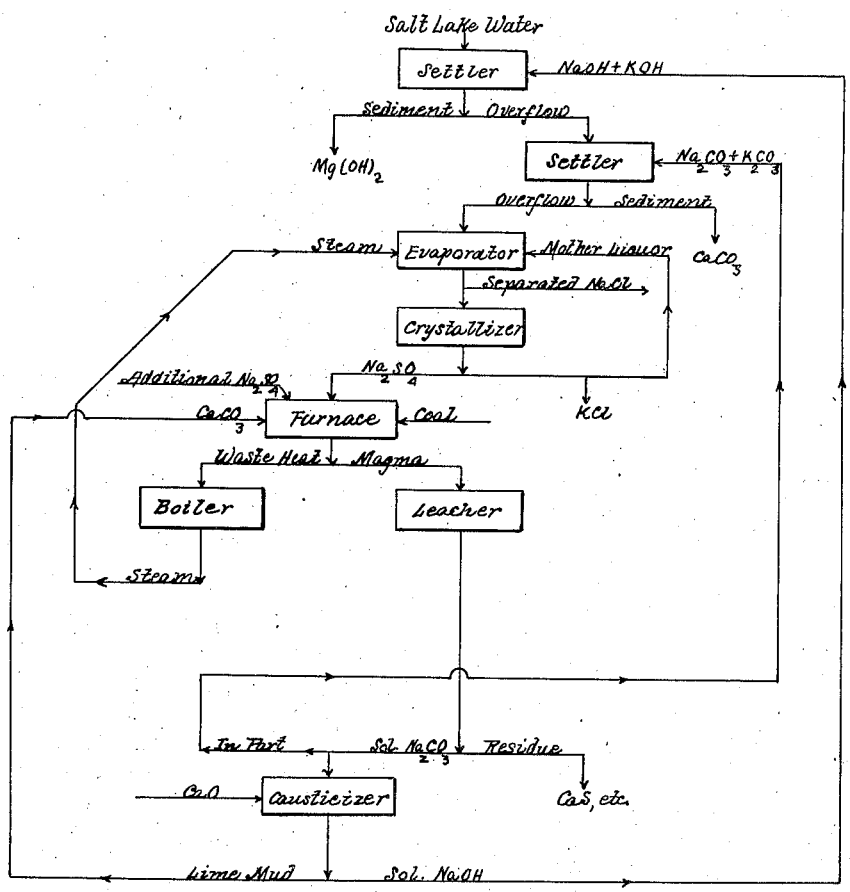

METHOD OF OBTAINING MAGNESIA AND POTASH FROM THE WATERS OF THE GREAT SALT LAKE

Alfred M. Thomsen, San Francisco, Calif.

Application November 5, 1941, Serial No. 417,954

5 Claims. (Cl. 23—37)

This invention deals in general with a method whereby the waters of the Great Salt Lake can be separated into its component parts of salt, potassium chloride, and its magnesium content in the form of the hydroxide. While the sulphate constituent is a large and important component of the water it does not figure herein as a recoverable constituent but rather as a component by the means of which said recoveries are made while the sulphate is destroyed in the operation.

On the attached flow sheet the chemistry of the process has been made very plain and will be discussed fully at a later time. However, there are sundry other matters of economic rather than of technical importance which will be first considered.

As already implied, the composition of the lake water is a complex of the sulphates and chlorides of sodium, potassium, and magnesium. Its salinity varies with the season but may be taken as closely approximating 20%. The solid residue will conform rather closely to the following composition. Magnesium, 2.6%, potassium, 1.6%, $SO_4$, 6.8%, the balance being sodium and chlorine. Bromine and carbonates appear only as traces. Lime is present to an extent of about 0.20%.

It will be evident that if such a solution is to be evaporated by artificial heat nothing will serve except a multiple effect evaporator with numerous "effects" in order that the fuel consumption be brought within the economic range. Were this body of saline water located near a center of population such might not be the case but located in the very heart of the great American desert it is evident that nothing can be considered of value save the potash and some relatively high grade form of magnesia which will bear transportation charges to the centers of consumption. In this connection it will also be evident that salt, as such, must be considered as of no value whatsoever.

To evaporate such a solution in multiple effect is evidently impossible unless the magnesium chloride be first removed, after which the lime or the sulphates must also be removed to prevent scaling. In view of the fact that the lime content is small and the sulphate content large it will evidently be preferable to remove the lime.

With lime and magnesia both removed there will be no difficulty in evaporating in multiple effect, discarding the major part of the salt and then obtaining by fractional crystallization two separate and distinct crystallizations, to wit, sodium sulphate and potassium chloride. Technically, this is not quite true for of necessity there will be a certain amount of the potash present in the sodium sulphate crystallization in the form of Glaiserite, the double sulphate of sodium and potassium. However, as this product is returned in its entirety to the parent solution in the form of hydroxide and carbonate, all contained potash is automatically restored and the objection will therefore be without force and effect. This is one of the great advantages which my system must have over any other projected process with which I am familiar.

As the magnesium is present in the original brine in part as chloride and in part as sulphate, while the calcium is present in the latter form, it will be self-evident that such an addition of sodium and potassium as carbonate and hydroxide must result in an increase of potassium and sodium ions in the liquor undergoing treatment. But inasmuch as all the sulphates are recycled and decomposed, as will be more fully described hereafter, consideration here need only be given to those potassium and sodium ions combined with chlorine as chlorides. These are removed from the brine at appropriate steps in the process, the sodium chloride by crystallization during ebullition, and the potassium chloride by crystallization of a more concentrated fraction by reduction of temperature.

With these preliminary explanatory remarks I will now elucidate my process by following the steps as illustrated on the flowsheet.

To the raw water is first added a solution of caustic soda which will cause the precipitation of virtually all of the magnesium in the brine as the virtually insoluble hydroxide. On the flow sheet this is shown as a single step but in practice it is advantageously separated into two, a very small addition being made at first followed by removal of settling of the resultant precipitate. This will be found to be quite dirty as it will enmesh and thus remove the finest of suspended impurities, organic as well as inorganic, present in the raw water.

To water thus purified the balance of the caustic soda solution may now be added and a very pure product will be obtained. As it is impossible to precipitate lime by means of caustic soda this will remain in solution and must next be removed. I have indicated this removal by means of the carbonate, but manifestly any insoluble lime salt could be substituted for the small amount of precipitant required so that even an expensive precipitant like phosphate or oxalate would be quite in order.

Settling removes this precipitate of carbonate, here induced by the addition of sodium carbonate, and there is now no bar to the application of the most modern type of multiple effect evaporator to remove the bulk of the water. This evaporation is, of course, accompanied by a corresponding separation of sodium chloride and is continued until the solution is strong enough to yield a crystallization of sodium sulphate and/or potassium chloride. As already indicated, this sodium sulphate product will inevitably contain some potassium as well in the form of glaiserite. The mother liquor from this crystallization is necessarily saturated with its component salts and is conveniently returned to the evaporator.

Such crystallization of the potassium chloride, and of the mixed sodium and potassium sulphates will naturally follow the well known requirements as to concentration and temperatures for such mixtures of salts. The potassium crystallizing as chloride is removed from the circuit, being a finished product, but the mixed sulphates are recycled by way of the furnace step, and its resident sodium will thus ultimately be split off from the circuit as sodium chloride and the resident potassium, similarly, will ultimately be obtained as potassium chloride.

Attention is now centered upon the use I make of this separated sodium sulphate with its attendant impurity of potash. On the flow sheet I show it entering a furnace where it is heated to fusion with the addition of some reducing coal and some calcium carbonate. The amount of coal is about 50% of the weight of sulphate and about as much is burnt as fuel to complete the reaction. The amount of calcium carbonate is about 100% by weight on the sulphate and is produced at a later step in the process. In addition, the carbonate precipitated out the brine would also be added in practice and, perhaps a little fresh limestone.

Evidently such use of fuel must be attended by a large amount of high temperature gases and the heat of these is conveniently used to heat a boiler which in turn will furnish all the steam needed for the evaporation of the brine and for the subsequent causticizing step.

The fused product yielded by the furnace is virtually a mixture of calcium sulphide and sodium carbonate with some surplus of lime and coal over the requirements for the reaction. This is now separated in a "leacher," into its components. I prefer to do this in the cold, in a rather dilute solution, and to employ a type of tube mill for the operation. If the melt from the furnace were simply put in water then solution would soon cease as the lumps would coat with insoluble calcium sulphide. If, however, the lumps were put in a rotating drum, then these lumps would by attrition remove such an insoluble coating and solution would proceed without impediment.

The result of such disintegration would be a slurry of calcium sulphide in a solution of sodium carbonate. Dilution is indicated because a cold, dilute solution will deliver a purer product than a more concentrated, hot solution. Furthermore, dilution of this carbonate solution is harmless as it is not advisable to prepare a solution of caustic soda of more than 11% strength.

Finally, even the effect of such dilution can be obviated by using as the liquid medium at the leacher the treated lake water, after the removal of magnesia and lime, in place of fresh water. So as not to confuse the issue, such items have been omitted from the flow sheet.

The sodium carbonate solution obtained from the leacher is used as such to remove lime, as indicated, and the surplus above this amount is causticized in the conventional manner by means of lime. The caustic soda thus obtained is then used in the principal precipitating step to remove magnesia from the brine undergoing treatment. The lime mud obtained as a by-product in this step is then returned to furnace as a source of calcium carbonate, and the cycle has been completed.

In my process, therefore, I obtain all the chemicals I need for the separations indicated out of the solution itself, lime being the only additive material and this does not directly contact the brine. However, a brine deficient in natural sulphates would, of course, require an addition of such sulphates in adequate amount. On the flowsheet I have indicated such an addition to the furnace step, as it is in this step that it is rendered effective, but being soluble in water it would, ultimately, reach this point anyway if it were added anywhere in the circuit. Conversely, a brine containing an excess of sulphates over and above the amount required to combine with the resident magnesium and calcium, when properly converted, would naturally discard such a surplus at any convenient point. The process may be considered as built around the use of the separated sulphate which is a mandatory item as in this manner only can the potash content of such sulphate be returned to the circuit so that all and not a part of the potash is ultimately recovered in the form of separated potassium chloride.

Having thus fully described my process, I claim:

1. The method of obtaining magnesium hydroxide and potassium chloride from brines consisting essentially of a water solution of the sulphates and chlorides of calcium magnesium, potassium, and sodium which comprises; adding sufficient alkali metal hydroxide so as to precipitate the magnesium resident therein as hydroxide and removing said precipitate; adding sufficient alkali metal carbonate to the residual solution from said magnesium hydroxide precipitating step to precipitate the calcium resident therein as calcium carbonate and removing said precipitate; evaporating the resultant solution with attendant separation of sodium chloride until the mother liquor thus produced shall have become sufficiently enriched in alkali metal sulphates to yield a crystallization of said alkali metal sulphates on cooling; cooling said mother liquor to obtain said crystallization of resident sulphates and separating said sulphates; converting said separated alkali metal sulphates into alkali metal carbonate and alkali metal hydroxide, respectively, and returning said alkali metal carbonate and said alkali metal hydroxide to fresh brine in the first two steps of the process for the removal of magnesium and calcium respectively; finally, concentrating and crystallizing the mother liquor from the sulphate separation for its resident potassium chloride which has now been made available through the re-cycling of the potassium constituent of the separated sulphates of the alkali metals.

2. The method of obtaining magnesium hydroxide and potassium chloride from brines consisting essentially of a water solution of the sulphates and chlorides of calcium magnesium, potassium, and sodium which comprises; adding sufficient alkali metal hydroxide so as to precipitate the magnesium resident therein as hydroxide and removing said precipitate; adding sufficient alkali metal carbonate to the residual solution from said magnesium hydroxide precipitating step to precipitate the calcium resident therein as calcium carbonate and removing said precipitate; evaporating the resultant solution with attendant separation of sodium chloride until the mother liquor thus produced shall have become sufficiently enriched in alkali metal sulphates to yield a crystallization of said alkali metal sulphates on cooling; cooling said mother liquor to obtain said crystallization of resident sulphates and separating said sulphates; commingling said separated sulphates of the alkali metals with calcium carbonate and carbon and fusing the mixture; separating the resultant mixture of calcium sulphide and alkali metal carbonate into its constituents by dissolving the latter constituent in water and removing the insoluble calcium sulphide; returning a portion of the alkali metal carbonate thus obtained to the process in the second step to remove the calcium resident in said brine; causticizing the remainder of said carbonate of the alkali metals and returning it as hydroxide to the first step of the process in the removal of the magnesium resident in said original brine, thus increasing the potassium content of said brine by the amount of potassium present in said alkali metal sulphate and its derivatives, carbonate and hydroxide; finally, concentrating and cooling the mother liquor from the sulphate separation to obtain a crystallization of resident potassium chloride, separating said potassium chloride and returning the mother liquor thus obtained to the operation at any point prior to the potassium chloride separation.

3. The method of obtaining magnesium hydroxide and potassium chloride from brines consisting essentially of a water solution of the sulphates and chlorides of calcium, magnesium, potassium, and sodium, which comprises; adding sufficient alkali metal hydroxide so as to precipitate the magnesium resident therein as hydroxide and removing said precipitate; adding sufficient alkali metal carbonate to the residual solution from said magnesium hydroxide precipitating step to precipitate the calcium resident therein as calcium carbonate and removing said precipitate; evaporating the resultant solution with attendant separation of sodium chloride until the mother liquor thus produced shall have become sufficiently enriched in alkali metal sulphates to yield a crystallization of said alkali metal sulphates on cooling; cooling said mother liquor to obtain said crystallization of resident sulphates and separating said sulphates; commingling said separated sulphates of the alkali metals with calcium carbonate and carbon and fusing the mixture; separating the resulting mixture of calcium sulphide and alkali metal carbonate into its constituents by dissolving the latter constituent in water and removing the insoluble calcium sulphide; returning a portion of the alkali metal carbonate thus obtained to the process in the second step to remove the calcium resident in said brine; causticizing the remainder of said carbonate of the alkali metals and returning it as hydroxide to the first step in the process in the removal of magnesium resident in said original brine, thus increasing the potassium content of said brine by the amount of potassium present in the re-cycled alkali metal carbonate and hydroxide respectively; finally, concentrating and crystallizing the mother liquor from the sulphate separation for its resident potassium chloride which has now been made available through the re-cycling of the potassium constituent of the separated sulphates of the alkali metals.

4. The method of obtaining magnesium hydroxide and potassium chloride from brines consisting essentially of a water solution of the sulphates and chlorides of calcium, magnesium, potassium, and sodium, set forth in claim 3, with the added step that precipitation with magnesium hydroxide be executed in two stages in place of one, namely; an initial very small addition to produce a colloidal precipitate of magnesium hydroxide containing occluded impurities, removing said precipitate and then adding the balance of the alkali metal hydroxide to the brine thus purified to precipitate the remainder of the magnesium resident therein as magnesium hydroxide.

5. The method of obtaining magnesium hydroxide and potassium chloride from brines consisting essentially of a water solution of the sulphates and chlorides of calcium, magnesium, potassium, and sodium, set forth in claim 3, with the added step that additional sulphates be added to the furnace step of said process when the amount of sulphate present be insufficient to yield enough hydroxide and carbonate of the alkali metals to precipitate the magnesium and calcium resident therein.

ALFRED M. THOMSEN.